United States Patent Office 3,674,603
Patented July 4, 1972

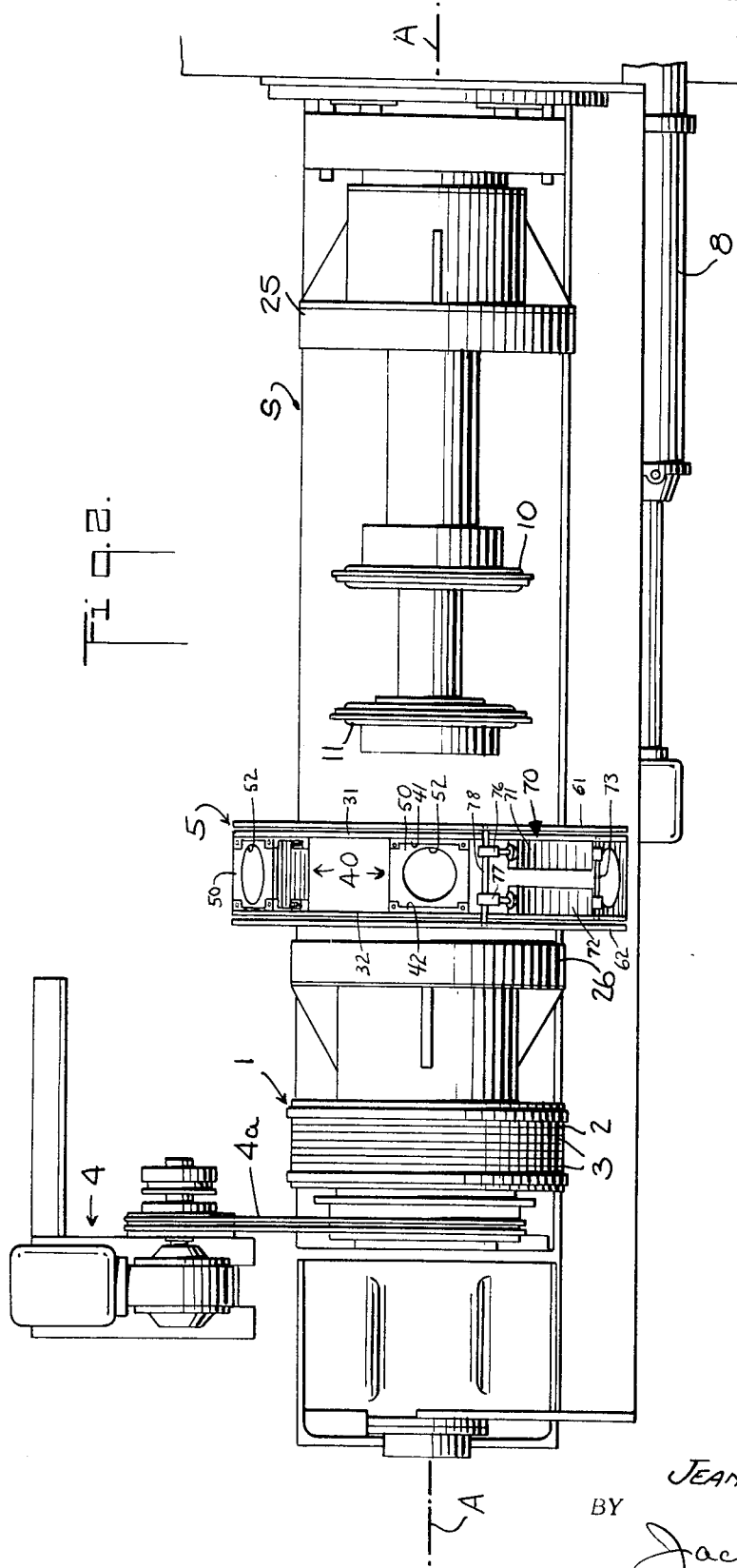

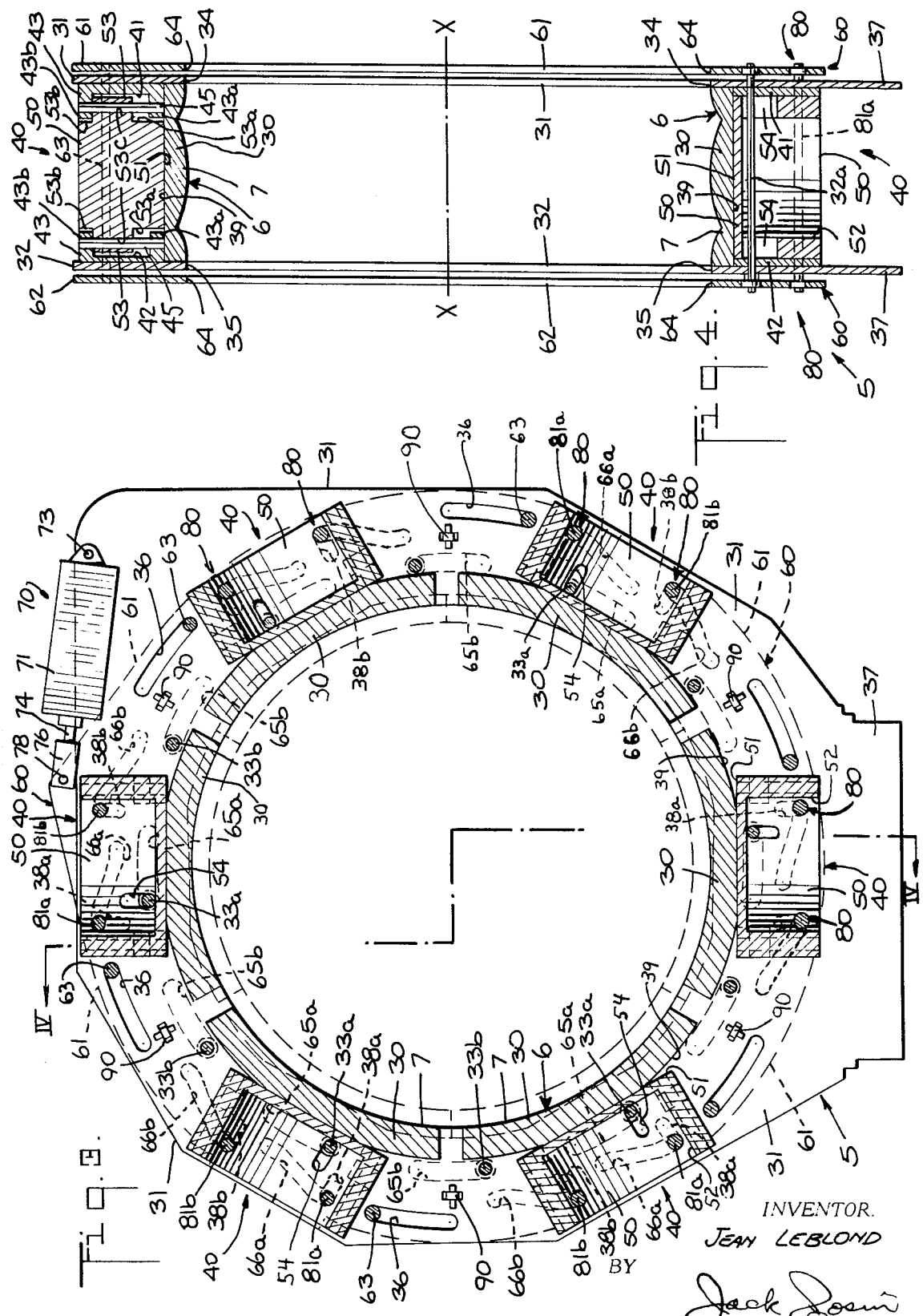

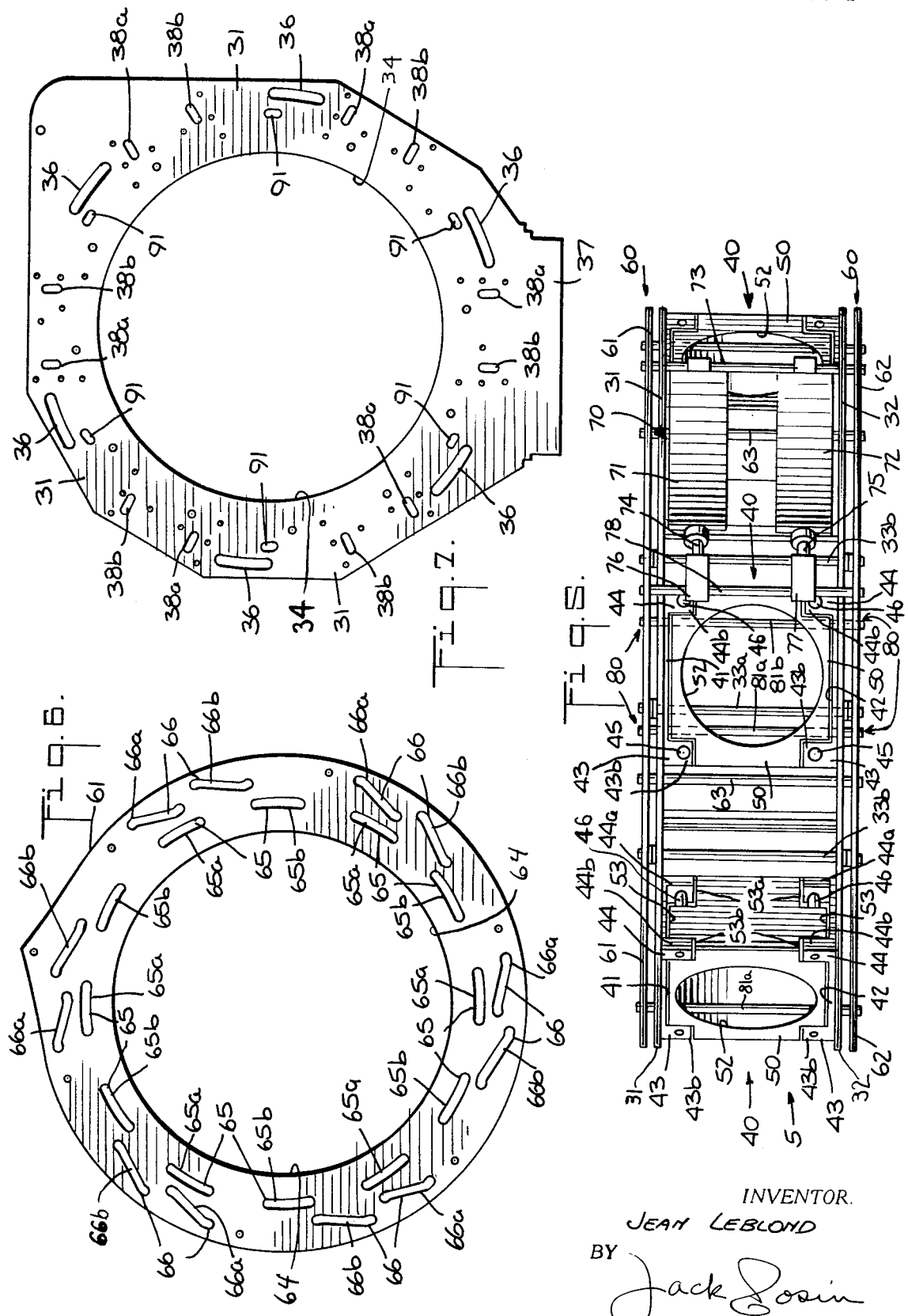

3,674,603
EXPANSIBLE AND CONTRACTIBLE
TRANSFER RING
Jean Leblond, Compiegne, France, assignor to Uniroyal
Engelbert France S.A., Neuilly-sur-Seine, France
Filed June 3, 1970, Ser. No. 42,986
Claims priority, application France, June 30, 1969,
6922084
Int. Cl. B29h 17/02
U.S. Cl. 156—394                     10 Claims

ABSTRACT OF THE DISCLOSURE

An expansible and contractible transfer ring for transferring a breaker-tread assembly from a building drum in a tire building machine to a tire carcass mounted on a shaping mechanism. The transfer ring includes a generally cylindrical frame structure, a plurality of radially movable arcuate segments arranged in a circumferential sequence within the frame structure, annular camming means movably supported by the frame structure about the segments, means supported by the frame structure and connected to the camming means for moving the camming means relative to the frame structure, and respective cam follower means carried by each of the segments and in engagement with the camming means for radially moving the segments in response to movement of the camming means relative to the frame structure.

---

The foregoing abstract is neither intended to define the invention disclosed in this specification, nor is it intended to be limiting as to the scope of the invention in any way.

This invention relates to tire building apparatus and, more particularly, to a transfer ring for transferring breaker-tread assemblies from a breaker-tread assembly building drum in a tire building machine to tire carcasses mounted on a tire carcass shaping mechanism. It is an improvement to the invention described and claimed in applicant's copending application Ser. No. 717,786, filed Apr. 1, 1968, and assigned to the assignee of the present application.

In the building of tires having breakers or belts incorporated in the crown area of the tire, as in the case of radial ply, belted tires for example, a two stage process is conventionally employed. During the first stage of building, a cylindrical tire carcass is formed having (1) one or more rubber covered cord plies wound around and interconnecting axially spaced, parallel, co-axial, bead cores and (2) a layer of rubber sidewall stock on each sidewall area of the carcass, intermediate the eventual crown area thereof and the two bead areas thereof. Such a carcass is referred to herein as a "first stage carcass." During the second stage of building, the shape of the first stage carcass is changed from a cylinder to a toroid and one or more rubber covered cord breaker plies and a rubber tread slab are added to the crown portion of the tire carcass to form what is referred to herein as a "second stage carcass." The term "rubber," as used herein, is intended to cover natural rubber, man-made rubber and rubbery materials. The term "cord," as used herein, is intended to cover single and multiple strands, filaments, wires or cables of natural and synthetic textile materials such as cotton, rayon, nylon, polyester, glass fiber, and the like, metal and/or such other materials as may be used as reinforcements in pneumatic tires.

Said co-pending application Ser. No. 717,786 describes an improved second stage tire carcass building machine, comprising: (1) a radially expansible and contractible breaker-tread assembly building drum (hereinafter also called "breaker building drum") having a magnetized outer surface for retaining building alignment of metallic cord breaker plies during the building of the breaker-tread assembly; (2) a pair of variably spaced tire carcass support and shaping discs co-axial with but spaced from the breaker building drum and providing for direct inflation of a first stage carcass supported thereon; (3) a segmented, radially expansible and contractible and axially movable, transfer ring for transferring breaker-tread assemblies from the breaker building drum to carcasses on the support and shaping discs; and (4) movable, conical, shaping rings engageable with the carcass sidewalls for limiting the same to a pre-determined pattern during inflation of the carcass.

Breaker-tread assemblies are fabricated in the aforesaid second stage carcass building machine by successively winding the various plies of each breaker and the tread layer about the radially expansible and contractible breaker building drum, which drum is axially spaced from but coaxial with the aforementioned inflatable first stage carcass on the support and shaping discs. Each breaker-tread assembly is then transferred from the outer surface of the breaker building drum to the inner surface of the radially expansible and contractible transfer ring, which ring, in its radially expanded conditions, is brought into a position surrounding the breaker-tread assembly and then radially contracted into engagement with the breaker-tread assembly. Thereafter, the breaker-tread assembly building drum is contracted to allow movement of the transfer ring, with the breaker-tread assembly therein, relative to both the breaker building drum and the inflatable first stage carcass. Next, the transfer ring moves each breaker-tread assembly to a position encircling the eventual crown area of the first stage carcass on the support and shaping discs. Then the carcass is inflated and the crown area thereof expands into pressurized contact with, and adheres to, the inner surface of the breaker-tread assembly in the transfer ring to form the second stage carcass. The transfer ring is then radially expanded and moved axially away from the carcass and the carcass is deflated to allow its removal from the support and shaping disc.

Although the machine described in said co-pending application is highly efficient and produces uniform, high quality second stage carcasses, the transfer ring utilized therein is complex and employs a plurality of independently operated, fluid-actuated, power cylinders to radially move the segments thereof, there being a different one of such cylinders operatively controlling each of the radially movable segments in the transfer ring. Applicant has determined that the construction and operation of the transfer ring can be significantly simplified and improved upon by employing a segment moving mechanism which is common to all of the segments and moves all of the segments of the transfer ring in synchronism when the transfer ring is being radially expanded or contracted.

Accordingly, the primary object of the present invention is to provide an improved tire building apparatus.

Another object of this invention is to provide an improved tire building apparatus for precisely and uniformly transferring breaker-tread assemblies from a building drum in a tire building machine to tire carcasses mounted on a shaping mechanism.

Yet another object of this invention is to provide an improved, segmented, breaker-tread assembly transfer ring in which the segments therof are synchronously radially expanded and contracted by a mechanism that is common to all the segments.

Further objects and advantages of this invention will become apparent as the following description proceeds.

Briefly stated, and in accordance with one embodiment of this invention, there is provided an expansible and contractible transfer ring for transferring a breaker-tread assembly from a building drum in a tire building machine to a tire carcass mounted on a shaping mechanism. The transfer ring includes a generally annular frame member, a plurality of radially movable arcuate segments arranged in a circumferential sequence and carried by the frame member, annular camming means supported by the frame member for rotational movement relative thereto, means supported by the frame member and connected to the camming means for rotating the camming means relative to the frame member, and respective cam follower means carried by each of the segments and in engagement with the camming means for radially moving the segments in response to rotation of the camming means relative to the frame member.

While the specification concludes with claims particularly pointing out and distinctly claiming the subject matter regarded as the invention, it is believed that the invention will be better understood from the following description, taken in connection with the accompanying drawings, in which:

FIG. 2 is a plan view of the machine shown in FIG. 1;

FIG. 3 is an enlarged sectional elevation view, taken along the line III—III of FIG. 1, showing the transfer ring;

FIG. 4 is a sectional elevation view of the transfer ring, taken along the line IV—IV of FIG. 3;

FIG. 5 is a plan view of the transfer ring shown in FIG. 3;

FIG. 6 is an elevation view of an annular camming member employed in the transfer ring of FIG. 3; and, FIG. 7 is an elevation view of an annular frame member employed in the transfer ring of FIG. 3.

GENERAL DESCRIPTION OF THE MACHINE

Figure 1:
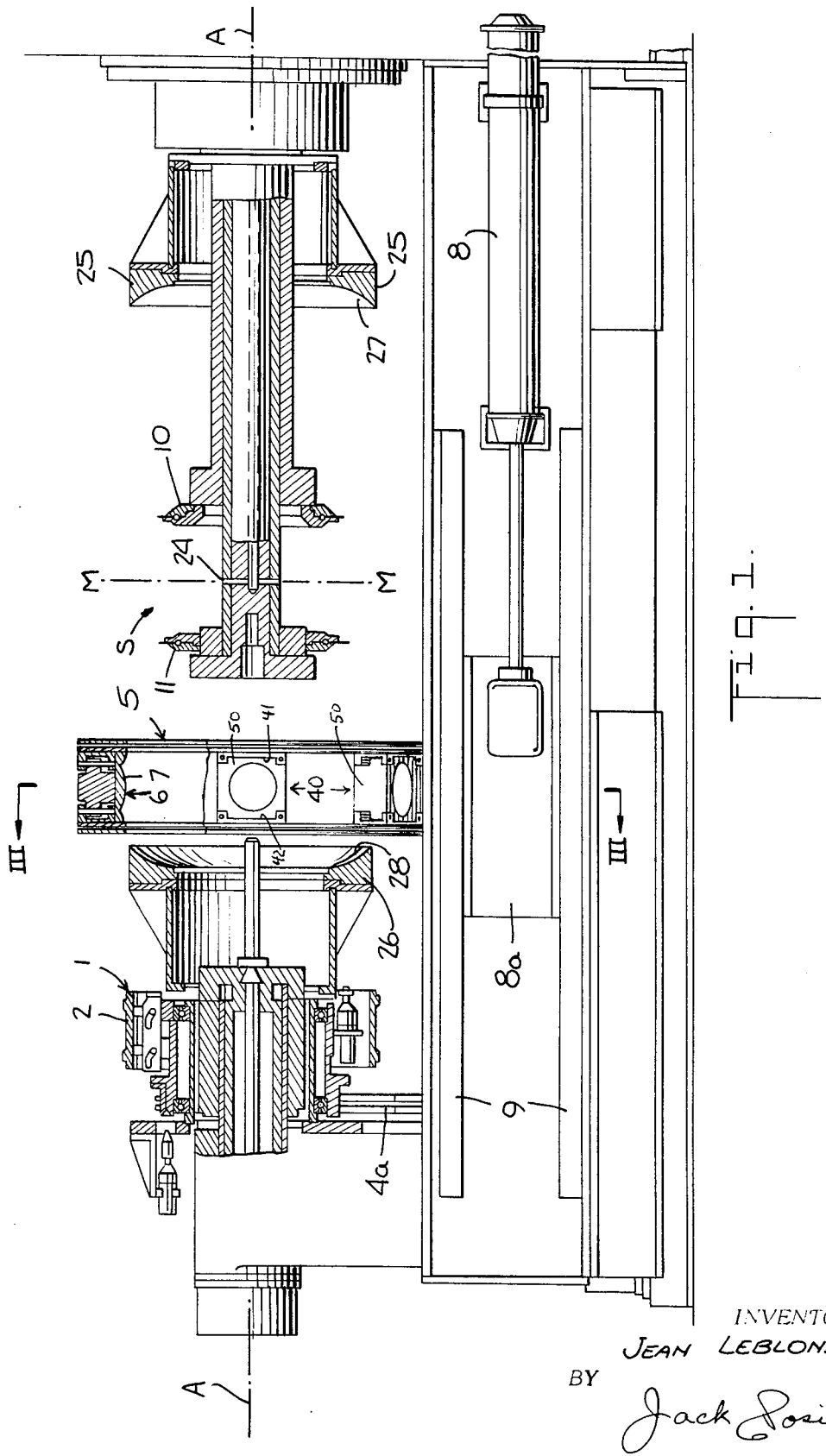
FIG. 1 is a side elevation view, with parts cut away for clarity, of a tire building machine embodying the present invention.

Referring to FIGS. 1 and 2, a tire building machine in accordance with one embodiment of this invention has been illustrated. The tire building machine generally comprises a radially expansible and contractible building drum, shown generally at 1, upon which breaker-tread assemblies are formed. These assemblies are formed in a recessed or grooved outer surface 2 of the drum, which surface is provided with a plurality of circumferentially extending grooves 3 (FIG. 2) that are filled with a magnetic elastomeric material, such as the barrium ferrite loaded, magnetized cured rubber described in U.S. Pat. No. 2,999,275 to W. S. Blume, Jr. The magnetic elastomeric material serves to attract the metallic cords of the breaker to the drum 1 to aid in maintaining precise alignment of the breaker relative to the drum. A driving means, shown generally at 4, is provided. The driving means 4 includes an electric motor, a suitable reduction gear and an electromagnetic clutch means, for rotating the drum via suitable drive belts 4a.

A transfer ring shown generally at 5, is provided for transferring the breaker-tread assembly formed on drum 1 axially along the axis A—A to a tire carcass shaping mechanism, shown generally at S in FIGS. 1 and 2. The transfer ring 5 is provided with a radially expansible and contractible ring shown generally at 6 (FIG. 1), the contour of the inner surface 7 of which conforms generally to the contour of the outer surface of the tread in the breaker-tread assembly formed on building drum 1. The transfer ring 5 is shifted from the position shown in FIG. 1 to a position in vertical alignment with the building drum 1 by means of an hydraulic power cylinder 8. The piston rod of cylinder 8 is connected to a sliding block 8a which moves in a guide 9, the sliding block 8a being rigidly inter-connected with (by means not shown) and serving as the support for the transfer ring 5.

As will be described in greater detail hereinafter, transfer ring 5 is provided with suitable means for radially contracting its ring 6 into contact with the outer surface of a breaker-tread assembly on the building drum 1. In building a tire, after the ring 6 is moved radially inward into contact with a breaker-tread assembly on the building drum 1, the drum is radially contracted to transfer sole control over the breaker-tread assembly to the transfer ring 5. Thereafter, this ring is axially shifted to the right, as viewed in FIG. 1, into vertical alignment with the median plane M—M of a first stage carcass mounted on end plates or discs 10 and 11 comprising the carcass supporting portion of the tire carcass shaping mechanism S.

Next, the sidewall shaping portions of the tire shaping mechanism S, comprising conical shaping rings 25 and 26, are moved toward the median plane M—M, into contact with the bead portions of the carcass which are sealingly engaged by the discs 10 and 11. At this time, the interior of the carcass on the discs 10 and 11 is inflated with fluid under pressure via conduit 24, and the shaping rings 25 and 26 and the discs 10 and 11 are axially moved closer to the median plane M—M to cause the first stage carcass to expand into contact both with the interior of the breaker-tread assembly, carried in transfer ring 5, and with the respective conical interior surfaces 27 and 28 of the shaping rings 25 and 26. The conical configuration of the interior surfaces 27 and 28 of the shaping rings confines the expansion of the carcass to a predetermined pattern, which pattern causes the shoulder areas of the carcass to be forced against the interior of the shoulder areas of the breaker-tread assembly to provide an improved junction between the carcass and the assembly.

After the breaker-tread assembly and the carcass are in good adhering contact with one another, the shaping rings 25 and 26 are moved axially away from the carcass, the ring 6 of the transfer ring 5 is expanded radially outward to free it from contact with the tread portion of the breaker-tread assembly, the transfer ring 5 is shifted axially out of alignment with the median plane M—M, clear of the carcass, the carcass is stitched, the pressure in the carcass is released, and the discs 10 and 11 are moved closer together to break the adhesion of the carcass thereto. Thereafter, the carcass is removed from the machine and the machine is returned to the condition shown in FIG. 1, ready to be recycled for the building of a new breaker-tread assembly and for the application of this new assembly to a new first stage carcass.

For a more detailed description of portions of the machine shown in FIGS. 1 and 2 other than the transfer ring 5, the reader's attention is directed to said co-pending application Ser. No. 717,786. Since the details of such other portions of the machine form no part of the present invention, this specification will continue with a detailed description of the improved tranfser ring 5.

THE TRANSFER RING 5

Referring to FIGS. 1 through 7, the transfer ring 5 serves as a means for transporting the breaker-tread assembly formed on drum 1 to the first stage carcass carried on discs 10 and 11 of the tire shaping mechanism S. Transfer ring 5 includes the hereinbefore mentioned expansible and contractible ring 6 having the tread-like inner surface 7 formed therein.

The expansible and contractible ring 6 comprises a plurality of substantially identical, arcuate, radially movable elements or segments 30, there being, for example, six such segments 30, as shown in the present embodiment. When the segments 30 are joined together end-to-end in the manner shown in broken lines in FIG. 3, they form a hollow cylinder, the axial cross-sectional profile of the inner surface 7 of which corresponds in shape to the outer surface of the breaker-tread assembly that is to be transferred, as may be seen in FIG. 4. The segments 30 may be moved radially between the contracted, or inner, broken-line positions shown in FIG. 3 and the expanded, or outer, solid line positions shown in FIG. 3, at which outer positions the inner diameter of the ring formed by the segments is greater than the maximum outer diameter of the breaker-tread assemblies formed on the drum 1. With the segments 30 in their outer positions, the transfer ring 5 may be freely moved axially from the position shown in FIG. 1 to a position in which its median plane is in alignment with the median plane of drum 1, there being clearance between the outer extremities of the breaker-tread assembly on the drum and the inner portions of the transfer ring.

The transfer ring 5 includes two annular frame members 31 and 32, each of which is similar to the one shown in FIG. 7. The frame members 31 and 32 are axially spaced from and rigidly interconnected to one another by a series of circumferentially spaced pairs of tie rods, each pair of tie rods comprising the tie rods 33a and 33b (FIGS. 3 and 5). The frame members 31 and 32 define an annular space between their respective annular portions and are provided with respective circular coaxial openings 34 and 35 (FIG. 4) therein, the axis X—X of the openings 34 and 35 being coaxial with the axis A—A (FIG. 1) of the machine.

A plurality of mechanisms, shown generally at 40, for guiding the movement of the segments 30, are carried by the frame members 31 and 32 in the annular space between these members, there being one such guiding mechanism 40 for each of the segments 30. Each guiding mechanism 40 includes first and second guide means 41 and 42 (FIGS. 4 and 5), respectively, fixedly carried by frame members 31 and 32, respectively, on the sides thereof which face one another, the guide means 41 and 42 being angularly aligned with one another relative to the axis X—X of the ring 5. Each guiding mechanism 40 further includes a slide means or sliding block 50 which has a corresponding segment 30 fixed to its radially inner surface. Each block 50 is slidably connected both to the guide means 41 and to the guide means 42 in its corresponding guiding mechanism 40. Each guide means 41 and 42 is generally U-shaped in plan (FIG. 5) and is provided with first and second axially extending leg members 43 and 44, respectively, which leg members are generally C-shaped in elevation (FIG. 4) and comprise, in the case of leg member 43, radially inner and outer portion 43a and 43b and, in the case of leg member 44 (FIG. 5), radially inner and outer portions 44a and 44b. The leg members 43 and 44 fixedly carry respective guide rods 45 and 46 therein. Guide rod 45 is supported at its ends by the portions 43a and 43b of leg member 43, and guide rod 46 is supported at its ends by the portions 44a and 44b of leg member 44.

Each sliding block 50 is generally in the shape of a rectangular prism and, as indicated earlier herein, has bolted or otherwise rigidly fastened to its radially inner surface 51 the radially outer surface 39 of a corresponding arcuate segment 30. The radially outer surface of each block 50 is provided with a large cylindrical opening 52 which extends radially through a major portion of the block so as to reduce the mass, and consequently the inertia, of the block. The side surfaces of the block 50 form corners 53 (FIGS. 4 and 5), each of which corners is recessed at its radially inner and outer portions 53a and 53b, respectively. The corners 53 are provided with apertures 53c (FIG. 4) through two of which apertures guide rods 45 pass and through the other two of which apertures the guide rods 46 pass, the arrangement being such that the block 50 is slidably movable only in a substantially radial direction on the guide rods 45 and 46.

The transfer ring 5 further includes an annular camming means, shown generally at 60, which is supported on the frame members 31 and 32 for limited rotational movement relative thereto. The annular camming means 60 includes two annular camming members or plates 61 and 62, each of which plates is similar to the one shown in FIG. 6. The camming members 61 and 62 are axially spaced from and rigidly interconnected to one another by a plurality of circumferentially spaced tie rods 63 (FIGS. 3-5). The camming members 61 and 62 are carried on the axially outer surfaces of the respective frame members 31 and 32 and suitable circumferentially spaced, arcuate slots 36 are provided in each of frame members 31 and 32 to allow the tie rods 63 to pass through the frame members to interconnect the camming members 61 and 62. The camming members 61 and 62 are each provided with a respective circular opening 64 (FIG. 6) therein, which opening is coaxial with the openings 34 and 35 (FIG. 4) in the frame members 31 and 32.

Each of camming members 61 and 62 is provided with a first series 65 (FIG. 6) of slots, which slots are arcuately oriented in circumferentially spaced positions about the circular openings 64 and are at a constant radius from the axis thereof. Each camming member 61 and 62 is also provided with a second series 66 (FIG. 6) of slots, which slots are oriented in circumferentially spaced positions about the circular openings 64, the distance from the axis of the openings 64 to corresponding points on each slot in the series 66 of slots progressively changing in like manner from one portion to another portion of each such slot so that the slots in this series each serve as a camming surface upon rotation of the camming members 61 and 62 relative to the frame members 31 and 32.

The slots in the first series 65 of slots are arranged in pairs, each of which pair comprises a slot 65a and a slot 65b, there being one pair of slots 65a, 65b provided in each camming member 61 and 62 for each segment 30. Similarly, the slots in the second series 66 of slots are arranged in pairs, each of which pair comprises a slot 66a and a slot 66b, there being one pair of slots 66a 66b provided in each camming member 61 and 62 for each segment 30.

As indicated earlier herein, tie rods 33a and 33b (FIG. 5) rigidly interconnect the frame members 31 and 32. Each of the tie rods 33a and 33b is provided with a roller assembly (not identified) at each of its ends, which roller assemblies ride within and cooperate with the respective slots 65a and 65b in the first series of slots 65 of camming members 61 and 62. The engagement of the roller assemblies of the tie rods 33a with slots 65a, the engagement of the roller assemblies of tie rods 33b with slots 65b, and the engagement of the tie rods 63 with the slots 36 in frame members 31 and 32, all serve to constrain the relative rotational movement between the camming members 61 and 62 and the frame members 31 and 32 to a limited angular amount, the lengths of the slot 65a, 65b and 36 extending through essentially equal angular amounts for this purpose.

Camming members 61 and 62 are synchronously rotated relative to frame members 31 and 32 by a motor means, shown generally at 70. Motor means 70 comprises a pair of double acting power cylinders 71 and 72, which cylinders are each pivotally mounted at one end thereof on a transverse rod 73 that extends between and is fixed to each of the frame members 31 and 32. The power cylinders 71 and 72 have respective pistons (not shown) operatively associated therewith, which pistons are provided with respective piston rods 74 and 75 that extend out of the ends of the power cylinders remote from rod 73. Adaptors 76 and 77 are fasted to the ends of piston rods 74 and 75, respectively. The adaptors 76 and 77 are each pivotally connected to a transverse rod 78 which extends between and is fixed to each of the camming members 61 and 62.

The frame members 31 and 32 are suitably rigidly interconnected with the sliding block 8a. (FIG. 1) of the machine, as by welding or bolting of flanges 37 (FIGS. 3 and 4) thereon to suitable brackets (not shown) carried by the sliding block 8a and extending therefrom to a point beneath the transfer ring 5. Accordingly, upon actuation of the power cylinders 71 and 72 in a manner to extend the piston rods 74 and 75 therefrom, the camming members 61 and 62 rotate counter-clockwise, as viewed in FIG. 3, in synchronism and in a predetermined angular amount relative to the frame members 31 and 32. The opposite occurs when the power cylinders 71 and 72 are actuated in a manner to retract the piston rods 74 and 75.

Cam follower means, shown generally at 80, are employed to synchronously move the segments 30 radially in response to the angular movement of the camming members 61 and 62. A cam follower means 80 is provided for each segment 30, and each cam follower means includes a pair of transverse cam follower rods 81a and 81b therein. Rods 81a and 81b are fixed to the sliding blocks 50 and are provided with roller assemblies (not identified) on their end portions. The end portions of rods 81a and 81b extend outwardly through respective clearance slots 38a and 38b (FIGS. 3 and 7) in frame members 31 and 32 so that their roller assemblies engage and ride on camming surfaces of the slots 66a and 66b, respectively, in the camming members 61 and 62. Accordingly, upon angular movement of camming members 61 and 62 due to the actuation of power cylinders 71 and 72, the cam follower rods 81a and 81b, and consequently the sliding blocks 50 and segments 30, are synchronously moved in equal amounts by the camming surfaces of slots 66a and 66b, the motion being constrained to a generally radial direction by the guide means 41 and 42 on the respective frame members 31 and 32. In order to permit the sliding blocks 50 to move relative to the stationary tie rods 33a in response to the angular rotation of the camming members 61 and 62, the blocks 50 are provided with clearance slots 54 (FIGS. 3 and 4) on each side thereof, through which slots the tie rods 33a pass.

Suitable rollers 90 (FIG. 3) are mounted in slots 91 (FIG. 7) at circumferentially spaced locations on each of the frame members 31 and 32. The rollers 90 are rotatable about radially oriented axes and serve to axially support and guide the camming members 61 and 62 relative to the frame members 31 and 32 during angular rotation of the camming members.

Suitable known electrical and fluid control circuits may be provided to initiate simultaneous operation of power cylinders 71 and 72 at proper times during operation of the machine shown in FIG. 1 to move the segments 30 from their contracted positions to their expanded positions, and vice versa. Such circuits would also control the operation of the power cylinder 8 (FIG. 1) and would be operatively associated with the control circuits of the remaining components of the machine.

From the foregoing description, it will be apparent that this invention provides improved tire building apparatus for transferring breaker-tread assemblies from a building drum in a tire building machine to tire carcasses mounted on a shaping mechanism, the improved apparatus comprising a transfer ring having breaker-tread assembly engaging segments which are synchronously radially expanded and contracted by a mechanism that is common to all of the segments.

While a particular embodiment of this invention has been shown and described, it will be apparent to those skilled in the art that various changes and modifications may be made without departing from this invention in its broader aspects, and it is, therefore, aimed in the appended claims to cover all such changes and modifications as fall within the true spirit and scope of this invention.

Having thus described the invention, what is claimed as new and desired to be protected by Letters Patent of the United States is:

1. An expansible and contractible transfer ring for transferring a breaker-tread assembly from a building drum in a tire building machine to a tire carcass mounted on a shaping mechanism spaced apart from the building drum, said transfer ring comprising: an annular frame member; a plurality of arcuate segments arranged in a circumferential sequence about a central axis, said segments being carried by said frame member and being substantially radially movable relative thereto; an annular camming means supported on said frame member for rotational movement relative thereto, said camming means comprising a plate member having a circular opening therein, said plate member being provided with a series of slots, said slots being oriented about said circular opening and being circumferentially spaced from one another, the distance from said axis of each of said slots progressively changing from one portion to another portion of each such slot, whereby said slots act as camming surfaces upon rotation of said plate member about said axis; means supported by said frame member and connected to said camming means for rotating said camming means relative to said frame member; and, respective cam follower means carried by each of said segments and in engagement with said camming means for substantially radially moving said segments in response to the relative rotation of said camming means.

2. A transfer ring as described in claim 1, said transfer ring further including a plurality of guide means carried by said frame member and a plurality of respective slide means fixed to said segments, said guide means and slide means, together, serving to limit the movement of said segments to only substantially radial movement relative to said frame member.

3. A transfer ring as described in claim 2, said means for rotating said camming means comprising at least one power cylinder, one piston and one piston rod, said power cylinder being pivotally supported on one or the other of said frame member and said camming means, said piston rod being pivotally connected to the remaining one of said frame member and said camming means.

4. An expansible and contractible transfer ring for transferring a breaker-tread assembly from a building drum in a tire building machine to a tire carcass mounted on a shaping mechanism spaced apart from the building drum, said transfer ring comprising: an annular frame member; a plurality of arcuate segments arranged in a a circumferential sequence, said segments being carried by said frame member and being substantially radially movable relative thereto; a plurality of guide means carried by said frame member and a plurality of respective slide means fixed to said segments, said guide means and slide means, together, serving to limit the movement of said segments to only substantially radial movement relative to said frame member; an annular camming means supported on said frame member for rotational movement relative thereto, said camming means comprising a plate member having a circular opening therein, said plate member being provided with first and second series of slots, the slots in each of said series being oriented about said circular opening and being circumferentially spaced from one another, the slots in said first series being arcuate portions of a circle which is coaxial with the axis of said circular opening, the distance from said axis of each of the slots in said second series progressively changing in like manner from one portion to another portion of each such slot, whereby said slots act as camming surfaces upon rotation of said plate member about said axis; means supported by said frame member and connected to said camming means for rotating said camming means relative to said frame member; and, respective cam follower means carried by each of said segments and in engagement with said camming means for substantially radially moving said segments in response to the relative rotation of said camming means.

5. A transfer ring as described in claim 4, said transfer ring further including a plurality of guide members fixed to said frame member and movably engaged by the slots of said first series of slots for limiting to rotational movement the movement of said camming means relative to said frame member.

6. A transfer ring as described in claim 5, said cam follower means being in engagement with the slots of said second series of slots.

7. A transfer ring as described in claim 6, said segments and said camming means being disposed substantially on opposite sides of said frame member, said cam follower means extending through respective slots in said frame member into engagement with said camming means.

8. An expansible and contractible transfer ring for transferring a breaker-tread assembly from a building drum in a tire building machine to a tire carcass mounted on a shaping mechanism spaced apart from the building drum, said transfer ring comprising: first and second spaced, parallel, rigidly interconnected, annular frame members defining an annular space therebetween, said members having coaxial circular openings therein; a plurality of arcuate segments arranged in a circumferential sequence coaxial with said openings, said segments being carried by said frame members and being substantially radially movable relative thereto; a plurality of angularly spaced guide means carried by each of said frame members on the side thereof which faces the other of said frame members, there being at least one guide means on each of said frame members for each of said segments; at least one slide means fixedly connected to each of said segments, each of said slide means being movably engaged with at least one guide means on each of said frame members and being substantially radially movable in the annular space defined by said frame members; first and second spaced, parallel, rigidly interconnected, annular camming members positioned axially outward of said first and second frame members, respectively, said camming members each being provided with at least one camming surface corresponding to each of said arcuate segments; support means carried by said frame members and in engagement with said camming members, said support means supporting said camming members on said frame members for relative rotation therebetween; at least two cam follower means carried by each of said slide means, one of said cam follower means extending axially outward of said slide means through a slot in said first frame member into engagement with one of said camming surfaces on said first camming member, the other of said cam follower means extending axially outward of said slide means through a slot in said second frame member into engagement with one of said camming surfaces on said second camming member; and, means for rotating said camming members relative to said frame members thereby to substantially radially move said segments relative to said frame members.

9. A transfer ring as described in claim 8, each of said camming members comprising a plate member having a circular opening therein, said plate member being provided with first and second series of slots, the slots in each of said series being oriented about said circular opening and being circumferentially spaced from one another, the slots in said first series being arcuate portions of a circle which is coaxial with the axis of said circular opening, the distance from said axis of each of the slots in said second series progressively changing in like manner from one portion to another portion of each such slot, whereby said slots act as camming surfaces upon rotation of said plate members about said axis.

10. A transfer ring as described in claim 9, said support means comprising a plurality of guide members fixed to said frame members and movably engaged by the slots in said first series of slots.

References Cited

UNITED STATES PATENTS

| | | | |
|---|---|---|---|
| 3,475,254 | 10/1969 | Henley | 156—416 X |
| 3,433,695 | 3/1969 | Caretta et al. | 156—415 X |

STEPHEN C. BENTLEY, Primary Examiner